United States Patent [19]

Harry et al.

[11] 4,362,498
[45] Dec. 7, 1982

[54] BLOW MOLDING CLAMP ASSEMBLY

[75] Inventors: Ieuan L. Harry; Suppayan M. Krishnakumar, both of Nashua; Walter R. Jolly, Merrimack; Martin H. Beck, Brookline, all of N.H.; John F. E. Pocock, Neu-Isenburg, Fed. Rep. of Germany

[73] Assignee: The Continental Group, Inc., Stamford, Conn.

[21] Appl. No.: 286,401

[22] Filed: Jul. 23, 1981

[51] Int. Cl.³ .............................................. B29C 17/07
[52] U.S. Cl. .................................. 425/526; 264/535; 425/534; 425/538; 425/541
[58] Field of Search ............... 425/526, 534, 538, 541; 264/535

[56] References Cited

U.S. PATENT DOCUMENTS

3,069,722  12/1962  Kato ................................. 425/541 X
3,339,230   9/1967  Farrell ................................... 425/526
3,998,576  12/1976  Frohn et al. ...................... 425/534 X

*Primary Examiner*—Jan H. Silbaugh
*Attorney, Agent, or Firm*—Charles E. Brown

[57] ABSTRACT

This relates to a blow molding system wherein a plurality of preforms are simultaneously blow molded within a mold set with the preforms being carried by one or more carriers which move first to a loading station to receive preforms, then through an oven to heat the preforms, then into a mold set wherein the plural preforms are simultaneously blow molded, then to an ejection station where the blow molded articles are discharged, and finally back to the loading station. There are two mold sets which are part of a clamp which operates sequentially to open and close each mold set with one mold set being closed as the other mold set is being opened. The carriers may travel either in a single continuous path for sequentially positioning at first one mold set and then the other, or there may be two continuous circuits for the carriers in which event the two mold sets of the clamp may be different. This abstract forms no part of the specification of this application and is not to be construed as limiting the claims of the application.

14 Claims, 14 Drawing Figures

BLOW MOLDING CLAMP ASSEMBLY

This invention relates in general to new and useful improvements in apparatus for the blow molding of a plurality of similar articles at the same time, and more particularly to the blow molding from preforms of articles wherein numerous preforms are carried by a carrier and are directed into the blow molding assembly and positioned therein by such carriers.

Certain of us have devised a clamp assembly wherein there are two sets of blow molds of the split type so that each blow mold includes separable halves and wherein preforms to be blow molded into articles, such as bottles, are first delivered between the halves of one set of molds and then a next series of preforms are delivered between the other set of molds. In our prior device, the carriers for the preforms were delivered to the blow mold sets along a single delivery track and removed therefrom carrying the blow molded articles along a single receiving track. The arrangement required a relatively great movement of the movable mold halves, thus requiring a greater time lapse. Further, actuators with a much greater movement were required.

In accordance with this invention, it is now proposed to utilize a clamp similar to the prior developed clamp incorporating two sets of blow molds, but wherein there are two supply tracks and two receiving tracks so that the required movement of the movable blow mold halves is restricted to that necessary to move blow mold halves from an open position spaced from corresponding fixed blow mold halves a distance only necessary to permit the exit of the blown articles to a closed position. At the same time, the relative positions of the set of blow molds are such that when one set of blow molds is closed below molded preforms carried by one carrier, the other set of blow molds is open and aligned with the associated tracks to permit the simultaneous entrance of a carrier carrying preforms and the exit of a carrier carrying blown articles.

In accordance with this invention, the carriers for the preforms and resultant blown articles may simply move along a continuous path and the carriers may be in the form of individual carriers, or the carriers may pass around a single path but be transversely moved at opposite ends of the runs of such paths. With such an arrangement, along each of the two runs of the paths preforms may be loaded, heated and presented to the clamp followed by the ejection of the blown articles.

In another alternative of the invention, there may be two separate paths with one run of each of the two paths being associated with a clamp. With this type of arrangement, the clamp may be provided with two different sets of blow molds so as to handle along one line one type of article and along the other line a different type of article.

In accordance with this invention, it is also feasible to move preforms at a uniform rate through an associated oven while presenting preforms to the oven and from the oven and through the clamp on a step-by-step basis in accordance with the operation of the clamp.

With the above and other objects in view that will hereinafter appear, the nature of the invention will be more clearly understood by reference to the following detailed description, the appended claims, and the several views illustrated in the accompanying drawings.

Figure 1:
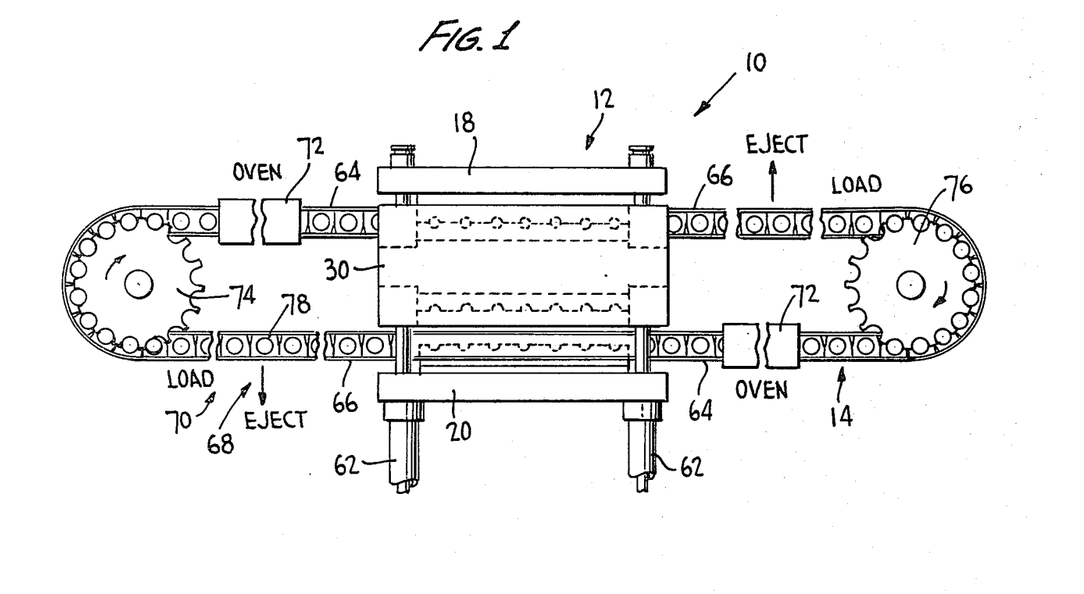
FIG. 1 is a plan view of a blow molding machine having a track arrangement and clamp assembly in accordance with this invention, parts being broken away.

Reference is now made to FIG. 1 wherein the simplest form of blow molding apparatus in accordance with the invention is illustrated and identified by the numeral 10. The blow molding apparatus includes a clamp, generally identified by the numeral 12, and a conveyor system, generally identified by the numeral 14.

Figure 2:
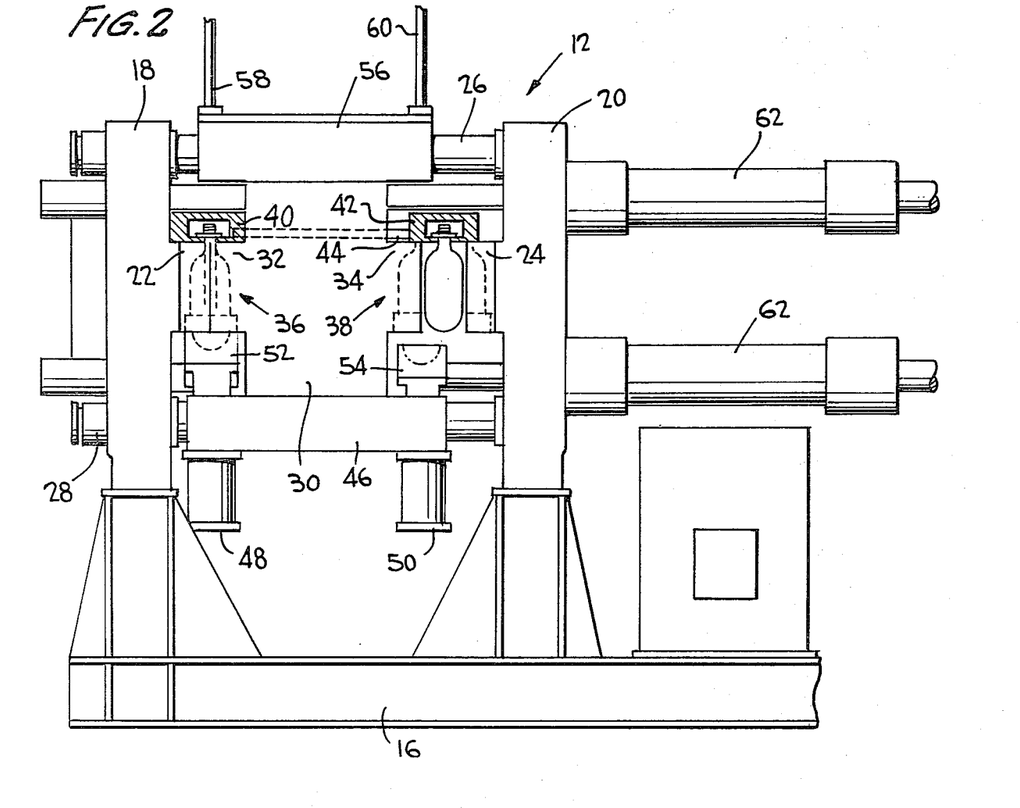
FIG. 2 is an enlarged schematic elevational view of the clamp assembly of FIG. 1, with parts broken away and shown in section.

Referring now to FIG. 2, it will be seen that the clamp 12 includes a base 16 having a pair of horizontally spaced, vertically extending platens 18, 20 which are fixed. The platen 18 carries a first set of fixed mold halves 22 each set of mold halves including any desired number of mold halves, but generally on the order of twelve to sixteen mold halves. The platen 20 carries a second set of fixed mold halves 24 with the number and type of mold halves in the set 24 corresponding to the number and type of mold halves in the set 24.

Suitable combined support and guide rods 26, 28 extend between the platens 18, 20 to form with the platens a rigid unit and also to support a shiftable clamp member 30 which is mounted between the platens 18 and 20. The clamp member 30 has mounted on that face thereof which opposes the platen 18 a set 32 of movable mold halves which cooperate with the mold halves of the set 22. On the other face of the clamp 30 which opposes the platen 20 there is another set 34 of movable mold halves which cooperate with the mold halves 24.

The sets 22, 32 of mold halves combine to form a mold set 36 while the sets 24, 34 of mold halves combine to form a mold set 38. A track member 40 is carried by the clamp member 30 and is associated with the mold set 36 while a like track 42 is associated with the mold set 38 is carried by the opposite part of the clamp member 30. The tracks 40, 42 are mounted for movement relative to the clamp member 30 on the rods 44. As is clearly shown in FIG. 2, when the mold set 36 is closed, the track 40 is clamped between the clamp member 30 and the platen 18 and centered relative to the mold set 36. On the other hand, the positioning of the track 40, through the rods 44, positions the track 42 in spaced relation with respect to both the platen 20 and the clamp 30 while centered with respect to the mold set 38.

The clamp member 30 carries a lower flange 46 which, in turn, carries vertically disposed fluid motors 48, 50 which, in turn, carry mold bottoms 52, 54, respectively, for the mold sets 36, 38. When it is desired to open the molds of the mold set 36, it is necessary that the mold bottoms 50 be first moved downwardly so as to strip them from molded articles, after which the mold half set 32 may be moved away from the mold half set 22. The mold bottoms 54 cooperate with the mold halves of the mold set 38 in a like manner.

The clamp member 30 also carries an upper flange 56 which is provided with sets of blow mechanisms 58, 60 which are associated with the mold sets 36, 38, respectively, for closing preforms and introducing a blowing gas under pressure into the preforms when the respective mold set is closed.

The platen 20 carries a plurality of fluid cylinders 62 which serve to position the clamp member 30 and the mold components carried thereby. As will be readily apparent from a comparison of the open mold set 38 and the closed mold set 36, the cylinders 62 need shift the clamp member 30 a distance only sufficiently great to clear a molded article longitudinally between the open mold halves of a respective set.

Referring once again to FIG. 1, it will be seen that the conveyor system 14 includes a pair of parallel runs with each run generally extending through the clamp assembly 12. Each run includes a supply track 64 and a receiving track 66 and each pair of the supply and receiving tracks having therebetween one of the tracks 40, 42. Each receiving track 66 has an eject station 68 and a loading station 70 while each supply track 64 has associated therewith an oven 72. At the ends of the two runs are drive sprockets 74, 76 which are driven in unison.

The sprockets 74, 76 and all of the tracks of the conveyor system 14 are filled with carriers 78 which in the illustrated form of the invention carry a single preform, but could be constructed to carry several preforms.

Figure 3:
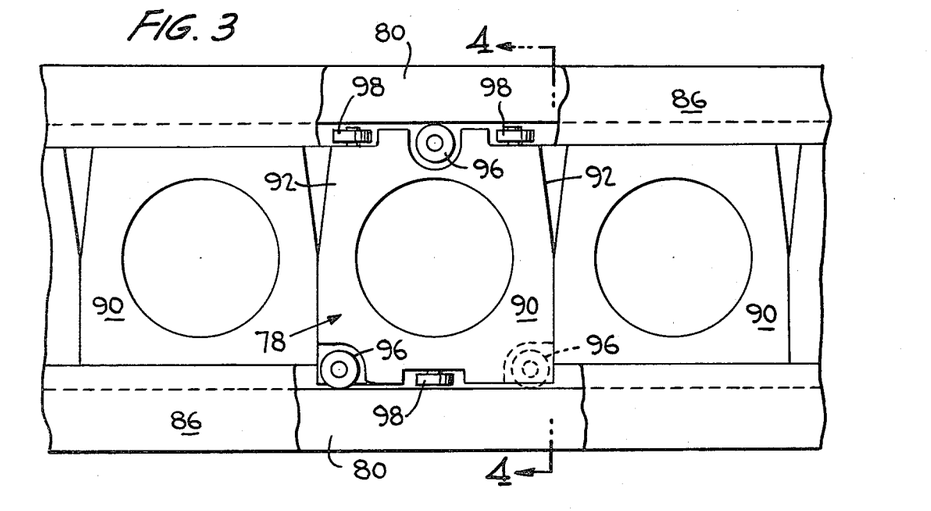
FIG. 3 is an enlarged fragmentary plan view of a portion of the track assembly, and shows generally the mounting of a carrier therein, parts being broken away.
Figure 4:
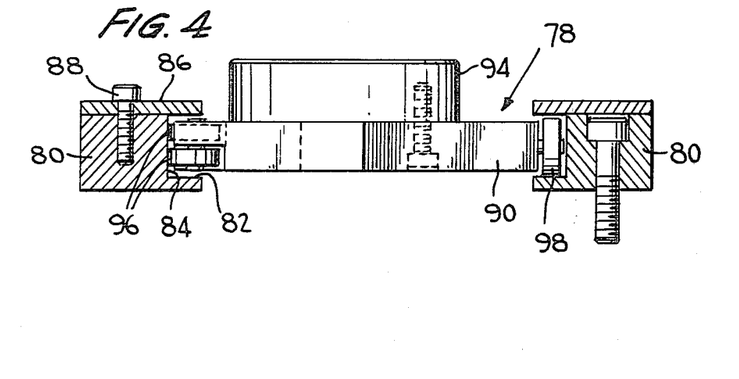
FIG. 4 is a fragmentary sectional view taken generally along the line 4—4 of FIG. 3, and shows further the relationship of a carrier with the track assembly.

Reference is now made to FIGS. 3 and 4 wherein a typical track and carrier relationship is illustrated. First of all, each track includes a pair of opposed generally L-shaped track elements 80 which define a horizontal support surface 82 and a vertical bearing surface 84. Each track element 80 is provided with a removable retainer plate 86 secured in place by fasteners 88.

Each carrier 78 includes a body 90 which, as is best shown in FIG. 3, is generally rectangular in plan, but has tapered sides 92 along one half thereof.

The base 90 will be constructed to releasably engage a neck finish on a conventional preform, such as a preform for a beverage bottle. This detail of the carrier 78 may vary, and therefore is not specifically illustrated here.

Each carrier has an upwardly projecting circular lug 94 which is engageable with the sprockets 74, 76 so that the sprockets may transport the carriers. Adjacent carriers bear against one another, as shown in FIG. 3, and push each other between the sprockets. By relieving inside corner portions of the bases 90, the carriers may pivot relative to one another to pass around the sprockets 74, 76.

Each carrier 78 is supported relative to a respective track by two sets of support wheels 96, 98 which are arranged in a triangular pattern. The support wheels 96 are horizontally disposed while the support wheels 98 are vertically disposed, as is clearly shown in FIG. 3. The support wheels 98 ride on the support surface 82 while the horizontal wheels 96 bear against the surface 84. It will also be seen that the two horizontal support wheels 96 carried by one side of the base 90 are vertically offset as is best shown in FIG. 4. In this manner the carriers 78 are free to be slightly self-adjusting.

It is to be understood that the sprockets 74, 76 are to be driven in unison and that they will be periodically turned so as to feed the carriers 78 into the clamp 12 in timed relation to the actuation of the clamp 12. It is also to be understood that the operation of the oven 72 should be sequenced with respect to the actuation of the sprockets. It is feasible to make the ovens 72 of a length corresponding to the effective length of the clamp 12 and to control the effective heating within the ovens 72 so that even though preforms to be heated therein are stationary within the ovens, they will be uniformly heated to the desired temperature.

Figure 5:
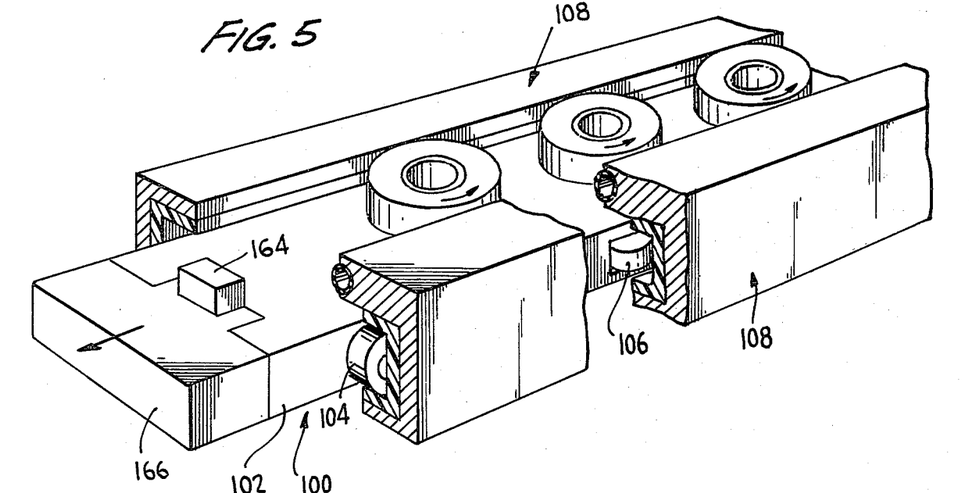
FIG. 5 is a perspective view with parts broken away and shown in section of a modified form of carrier and track assembly.
Figure 6:
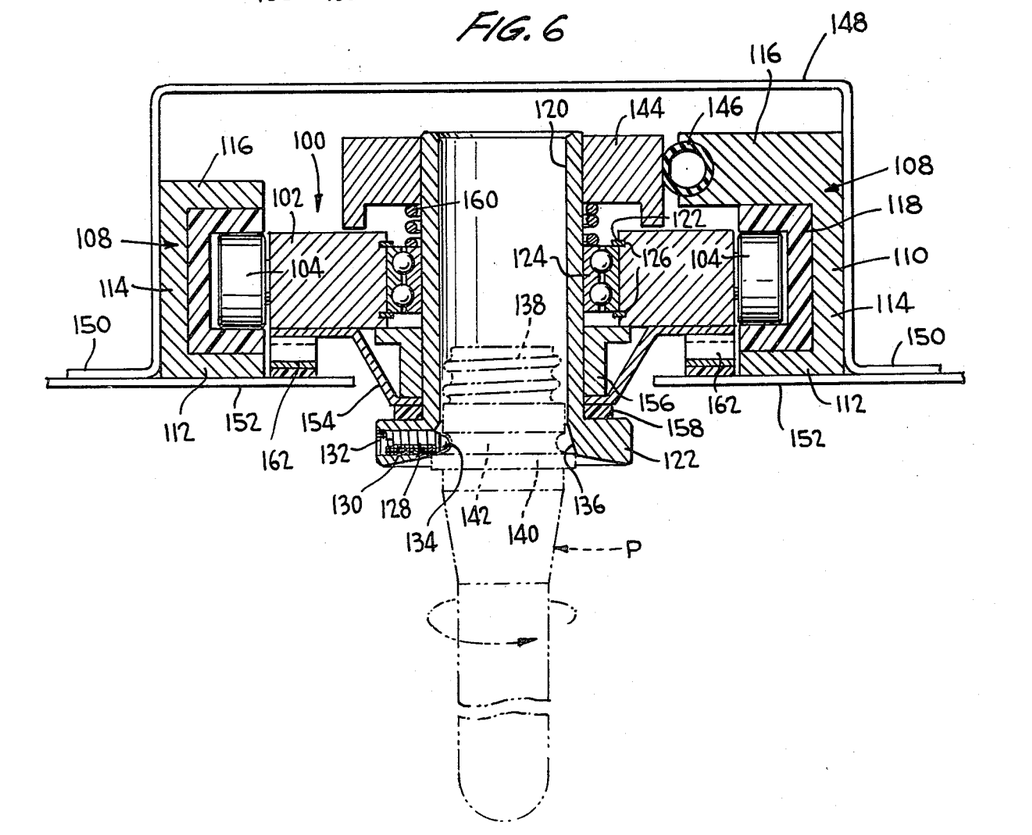
FIG. 6 is a transverse vertical sectional view taken through the carrier and track assembly of FIG. 5, and shows further the constructional details thereof.

Reference is now made to FIGS. 5 and 6 wherein there is illustrated a modified form of carrier, generally identified by the numeral 100. Each carrier 100 is of a length and construction to receive a number of preforms P corresponding to the number of molds in each of the mold sets 36, 38 so that a single carrier 100 may present to a respective mold set the required number of preforms.

Each carrier 100 includes an elongated body member 102 which has rotatably journalled at the opposite sides thereof sets of vertically disposed wheels 104 and horizontally disposed wheels 106. The wheels 104, 106 are engaged with track members 108 which are arranged in opposed pairs and form individual track sections. Each track member 108 includes an outer channel shaped track element 110 which includes a bottom flange 112, a vertical web 114 and a top flange 116. When the heating means for the preforms is to be of the radio frequency type, then each track element 110 will be provided with a channel shaped liner 118 which is preferably formed of a suitable plastic material or other non-electrical conductor.

It is to be understood that the arrangement of the wheels 104, 106 is such that the body member 102 can freely move between the track members 108 without jamming.

Each carrier 100 is provided with a number of support sleeves 120 in accordance with the number of preforms to be carried, and each support sleeve 120 extends through an opening 122 in the body 102 and is carried by a bearing 124 which is seated in the opening and is restrained against vertical movement by way of suitable retaining rings 126. The sleeve 120 is free to move vertically through the bearing 124 in a manner to be described hereinafter.

Each sleeve 120 is provided at its lower end with a thickened flange 122 which carries one or more detent units 128. Each detent unit 128 includes a detent body 130 which is externally threaded and which is adjustably positioned within a radial bore 132 which is internally threaded. The inner end of the body 130 has projecting therefrom a ball 134 which is restrained within the detent body 130 against escape and is resiliently urged out of the detent body by resilient means (not shown).

It is also to be noted that the flange 122 has a tapered opening 137 which facilitates the entrance of the neck finish 138 of a typical preform P into the flange 122 and then into the sleeve 120. It is also to be noted that the typical preform P may be provided with the usual support flange 140 and above the support flange 140 there will be an annular groove 142 into which the detent balls 134 may snap, thus resiliently retaining the associated preform within the lower portion of the sleeve 120.

The sleeve 120 is provided at its upper end with a drive wheel 144 which is engaged with a drive member 146 carried by the flange 116. The illustrated drive member 146 is in the form of a rubber hose or tube which is seated in the flange 116 and which projects from the flange 116 a distance wherein when a drive wheel 144 is adjacent it, it will be flattened to provide an effective frictional contact with the drive wheel 144 so as to rotate the drive wheel 144 and the associated sleeve 120 as the carrier 100 moves along the track member.

When the oven of the system employs RF heaters, it is necessary to ground the sleeve and to shield the entire carrier 100. Accordingly, the track section which passes through an oven, to be described hereinafter, is shielded by means of an inverted channel shaped shield 148 having a pair of mounting flanges 150. The mounting flanges 150 carry grounding elements 152 which project generally within the space between the track members 108, as is clearly shown in FIG. 6. The body 102 is provided with a horizontal grounding member 154 which includes a generally frustoconical portion and which has extending therethrough a lower part of the sleeve 120. The sleeve 120 carries above the grounding element 154 a collar 156. Between the grounding elements 154 and the flange 122 is a spacer 158 which is preferably formed of an insulating material.

In order that the flange 122 may generally clamp the grounding element 154 against the collar 156, there is a spring 160 which is disposed between the bearing 124 and the wheel 144 which urges the sleeve 120 upwardly.

The grounding element 154 is provided at its periphery with a shoe element 162 which bears against the grounding plates 152.

Referring once again to FIG. 5, it will be seen that each body 102 is provided at at least one end thereof with an upstanding abutment member 164 which is utilized in applying a driving force to the body 102 so as to move the carrier 100 along the track. The abutment 164 may, as illustrated in FIG. 5, be part of a replaceable end member 166 for the body 102.

Reference is now made to FIGS. 7A-7F and 8 wherein there is illustrated a blowing system, generally identified by the numeral 168, in which the carriers 100 are utilized and wherein the carriers move along track segments formed of track members 108, but wherein for the purpose of simplicity the track segments are not shown.

First of all, it is to be understood that there will be a centrally positioned clamp 170 which will be similar to the clamp 12 but wherein the tracks thereof will differ from the tracks 40, 42 of the clamp 12 so as to be formed of track members 108 as illustrated in FIGS. 5 and 6.

In accordance with the apparatus shown in FIGS. 7A-7F, there will be two lanes of movement of the carriers. Each lane will be provided in advance of the clamp 170 and in spaced relation with respect thereto with an oven 172. Each lane will also be provided downstream of the clamp 170 with a blown article (bottle) ejection station 174 and a preform loading station 176. There will also be at the opposite ends of the two lanes lane transfer stations 178,180.

It is to be understood that in the apparatus 168, in order to obtain assured uniform proper heating of the preforms, the preforms will be continuously moved through the ovens 172, but will otherwise be moved in a step-by-step manner through the apparatus. Suitable feed means for engaging the abutments 164 will be provided. These feed means include sequentially actuated feed units F1-F10 and continuous feed units C1 and C2.

Figure 7A:
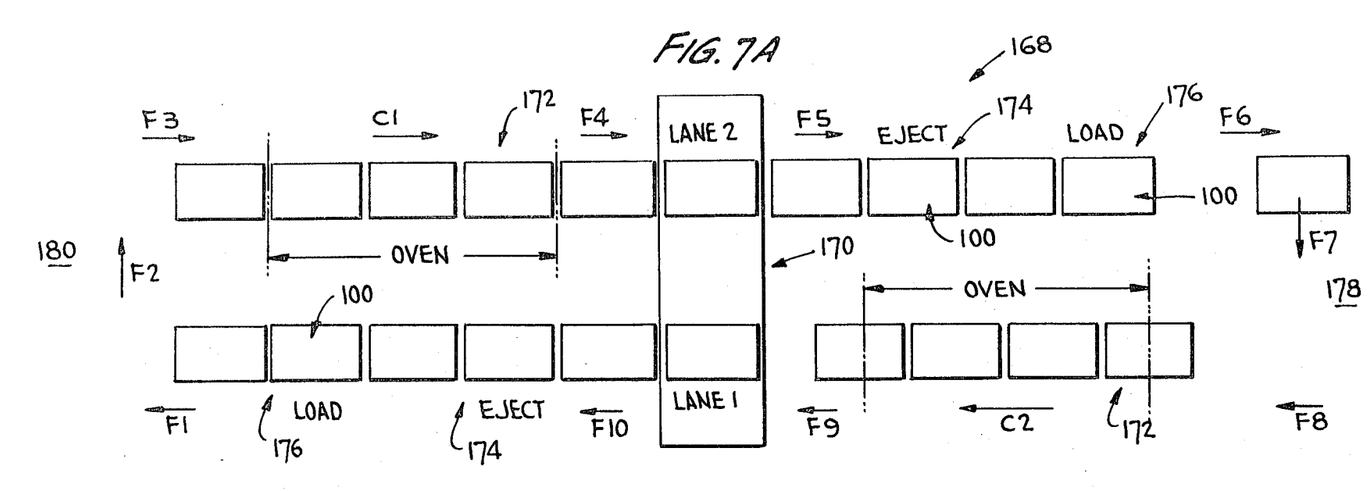
FIGS. 7A–7F is a schematic plan view showing the movement of the carriers with respect to components of the blow molding apparatus.

Referring first to FIG. 7A, it will be seen that the position of the clamp 170 is one wherein the mold set of lane 1 has just closed and the mold set of lane 2 has just opened. The continuous feed units C1 and C2 are moving carriers through the ovens 172 with a full carrier just beginning to exit from the oven of lane 2 and a carrier being half way out of the oven of lane 1. The carrier at the right end of lane 2 is ready to be received in the transfer unit 178 for action by the feed unit F7.

Figure 7B:
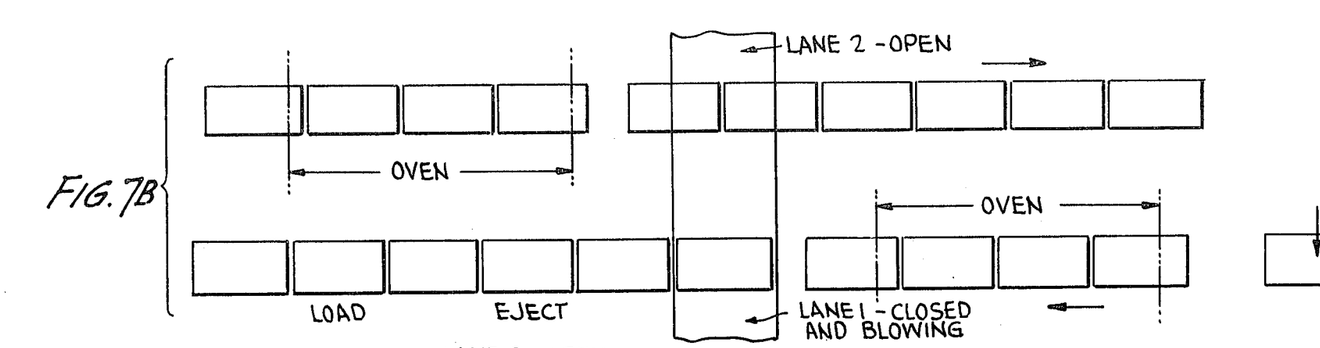

Referring now to FIG. 7B, it will be seen that the feed unit F7 has now transferred the previously described carrier from lane 2 to lane 1 and the feed unit F4 has been actuated to move the carrier positioned between the oven and the mold set of lane 2 into the clamp, forcing the carrier containing previously blown articles out of the clamp. At this time the mold set of lane 1 is now being operated to effect blowing of the preforms positioned therein and the mold set of lane 2 is open.

Figure 7C:
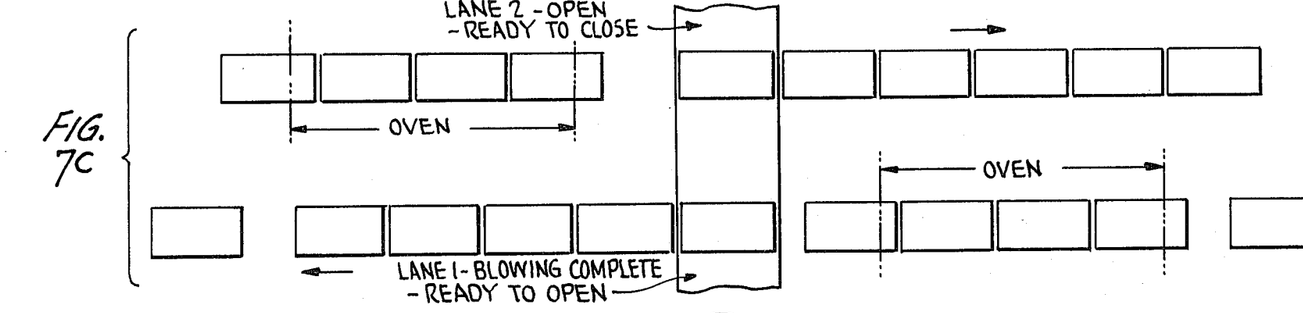

Referring now to FIG. 7C, it will be seen that the carrier is now fully positioned in the mold set of lane 2 and that mold set is ready to close, with the mold set of lane 1 having completed its blowing cycle and ready to open. At this time feed units F1 and F8 have been actuated to move associated carriers along lane 1.

Figure 7D:
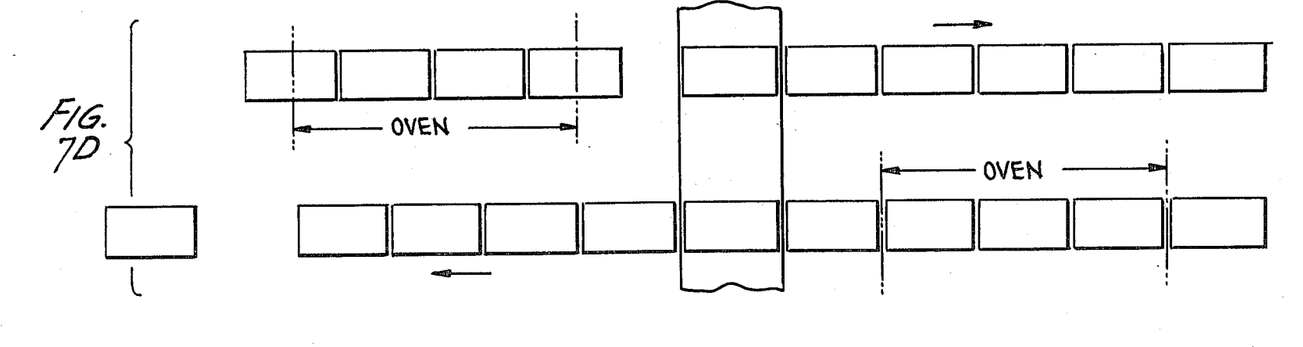

Reference is now made to FIG. 7D wherein the mold set of lane 1 has now opened and the continuous feed unit C2 has completely moved a carrier out of the oven of lane 1 is ready to be transferred into the clamp 170. At the same time feed unit F8 has moved the carrier recently transferred from lane 2 to lane 1 into position at the entrance to the oven 172 of lane 1. Feed units F4 and F5 have moved carriers along lane 2 with the carrier carrying heated preforms fully moved within the clamp and the mold unit of lane 2 closed ready to start blowing of the heated preforms.

Figure 7E:
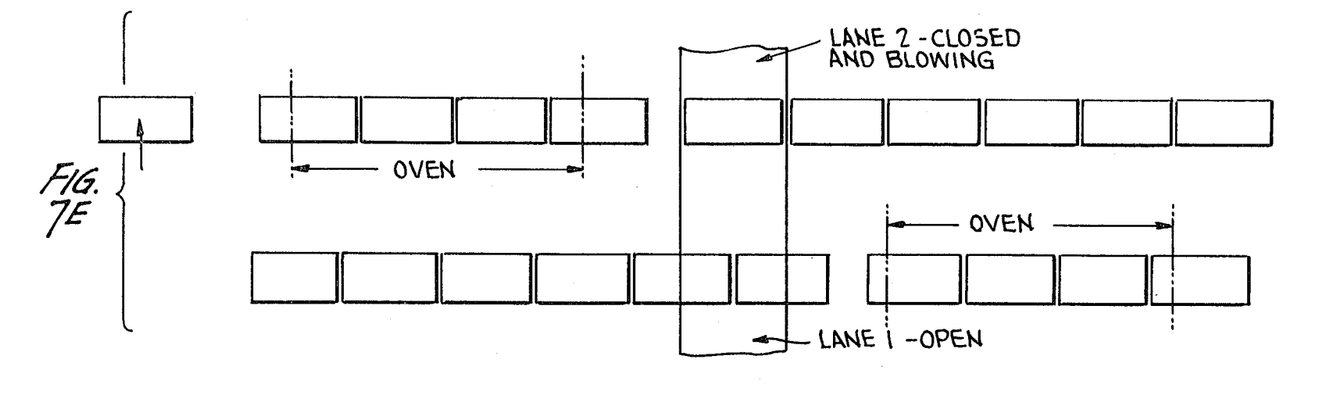

Referring now to FIG. 7E, it will be seen that the carrier at the left end of lane 1 has been transferred to lane 2 by the feed unit F2. The mold set of lane 1 is now open and there is being transferred into the mold set of lane 1 a carrier by feed unit F9 and feed Unit F10 is feeding carriers which have passed through the clamp to the left along lane 1. At this time a carrier is approximately two-thirds of the way out of the oven 172 of lane 2 and a carrier has just begun to exit from the oven of lane 1.

Figure 7F:
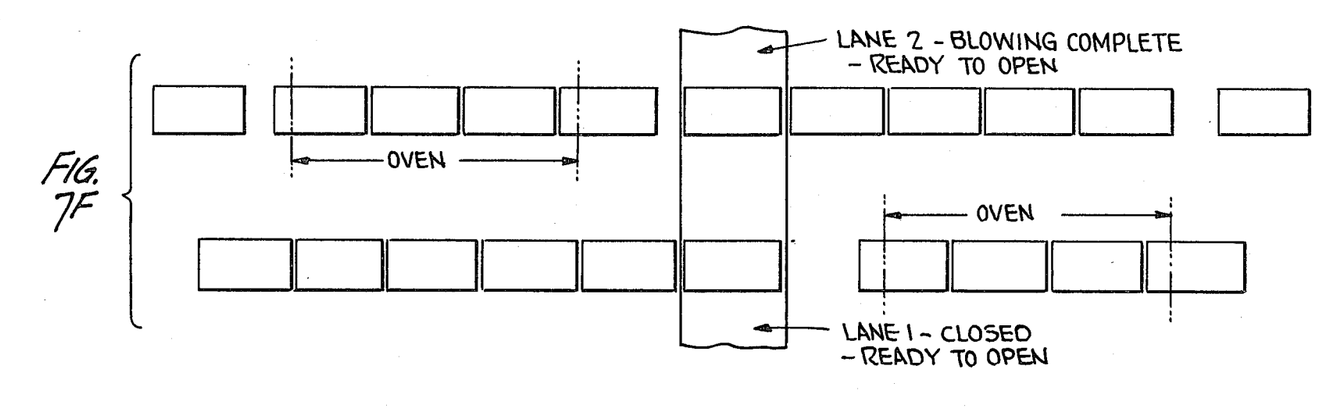
Figure 8:
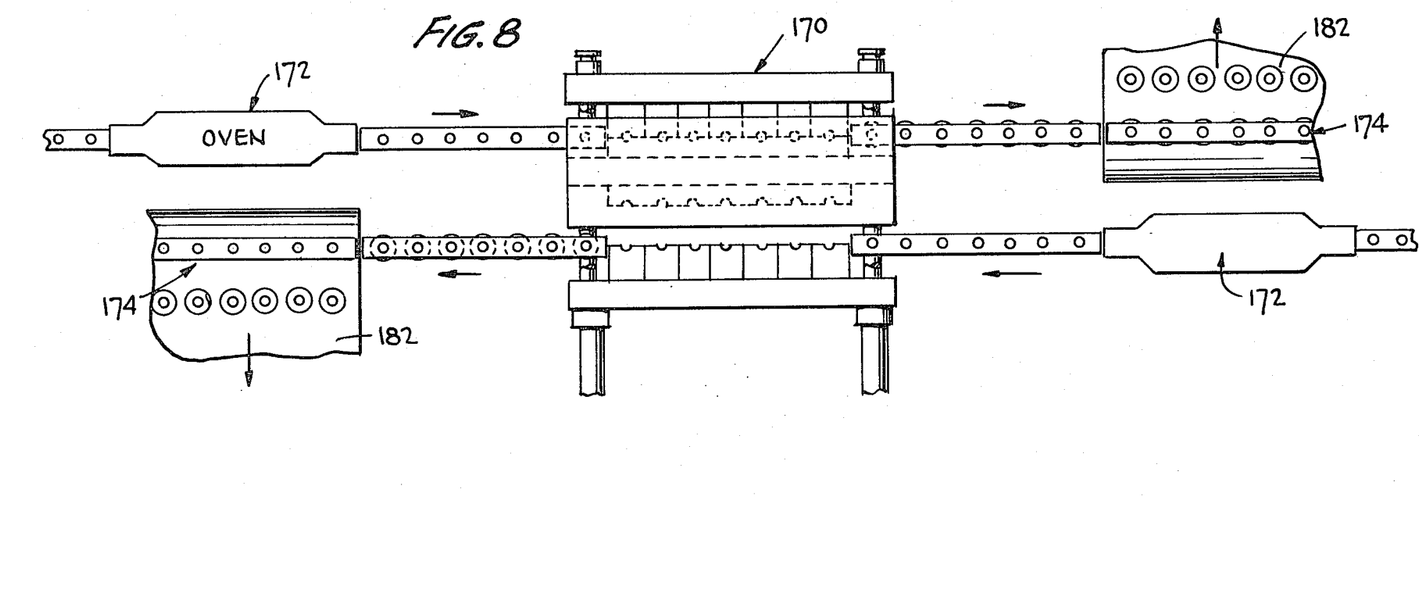
FIG. 8 is an enlarged fragmentary plan view showing further the details of the blow molding apparatus of FIG. 7.

Referring now to FIG. 7F, it will be seen that the mold set of lane 2 has completed its blowing cycle and is ready to open, while the mold set of lane 1 is ready to close, the feed unit F9 having fully fed a carrier carrying heated preforms thereinto. The feed unit F3 is now feeding the carrier which was most recently transferred from lane 1 to lane 2 and the feed unit F6 is feeding the endmost carrier into the transfer unit 178.

It will be seen that the continued movement of the carriers as described above, together with the actuation of the clamp 170, will result in the system completing its cycle back to the position of FIG. 7A with the carriers in each of lanes 1 and 2 having advanced one step through the system.

It is to be understood that the feed units F1–F10 are all moved simultaneously and in unison. The specific details of these feed units in no way form a part of this invention and therefore no further description will be made here.

Figure 9:
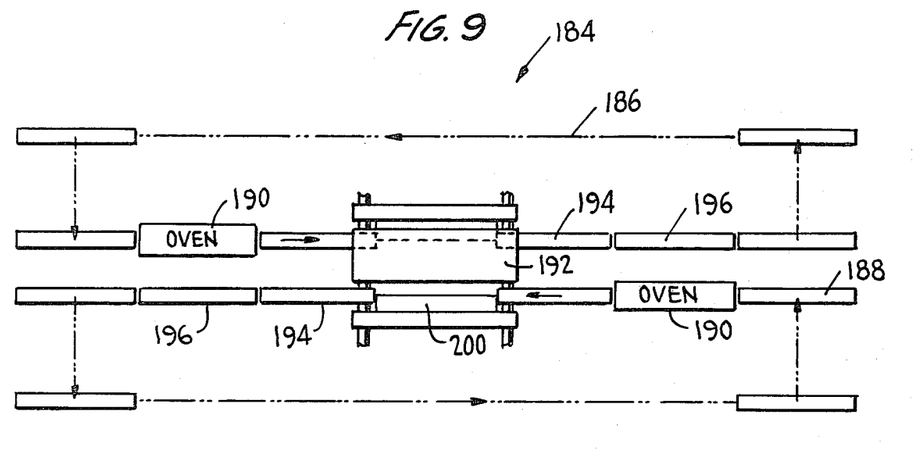
FIG. 9 is a schematic plan view showing a blow molding apparatus similar to that of FIG. 7, but wherein the two runs of the paths of movement of the carriers are parts of two separate conveyor systems.

Reference is now made to FIG. 9 wherein there is schematically illustrated another blow molding system generally identified by the numeral 184. The blow molding system 184 may be similar to the blow molding system 10 and the blow molding system 168, but differs from both in that there are two continuous paths 186, 188 through which carriers are moved. Each continuous path 186, 188 will be provided with an oven 190 in advance of a clamp 192 and with a blown article ejection station 194 and a preform loading station 196 downstream of the clamp 192.

The system 184 has an advantage over the systems 10 and 168 in that each continuous path 186, 188 may be provided with carriers for carrying preforms of different types from which the resultant blow molding articles may be different. Further, the clamp 192, which is provided with two mold sets 198, 200, may have the mold sets composed of different types of molds. For example, in the case of the molded articles being bottles, the mold set 198 could be of a configuration for molding the same size bottle as the mold set 100, but of a different configuration. In a like manner, the bottles molded within the mold sets 198, 200 may be of different sizes and the number of bottles which are blow molded in the respective sets may differ in number, the number of bottles decreasing as the size of the bottle increases. For example, ten half liter bottles could be blow molded in one mold set and six two liter bottles molded in the other mold set.

Although only preferred embodiments of the invention have been specifically illustrated and described herein, it is to be understood that minor variations may be made in the various systems, the carriers, the clamps and the track elements, without departing from the spirit and scope of the invention as defined by the appended claims.

We claim:

1. A blow molding clamp assembly comprising fixed remote mold half sets, companion mold half sets mounted as a unit and for movement for selected cooperation with a respective one of said fixed mold half sets wherein when one set of said mold halves is closed the other set of said mold halves is open, said clamp assembly including a track section associated with each set of mold halves for receiving preform carriers, means mounting each of said track sections for movement between a position generally centered relative to a respective set of mold halves when open and a position centered relative to said respective sets of mold halves in their closed positions, and the positions of said track sections when aligned with open mold halves being different.

2. A clamp assembly according to claim 1 wherein the total movement of said companion mold half sets is generally that required to move one of said movable mold half sets to a normal open position.

3. A blow molding apparatus comprising the clamp assembly of claim 1 together with two supply and two return track units positioned for supplying preform carriers to respective ones of said track sections and receiving preform carriers from respective ones of said track sections.

4. A blow molding apparatus according to claim 3 wherein said supply track units are arranged in diagonal relation for supplying preform carriers to opposite ends of said clamp assembly from different directions.

5. A blow molding apparatus according to claim 3 wherein said two supply and said two return track units are parts of a single continuous track assembly.

6. A blow molding apparatus according to claim 5 wherein there is an oven associated with each of said supply track units.

7. A blow molding apparatus according to claim 3 wherein there is an oven associated with each of said supply track units.

8. A blow molding apparatus according to claim 6 wherein said apparatus includes plural feed sections, said feed sections including a continuously advancing feed section for each of said ovens and an interrupted feed section for the remainder of said track assembly.

9. A blow molding apparatus according to claim 8 wherein said interrupted feed section includes a plurality of separate interrupted feed units.

10. A blow molding apparatus according to claim 5 wherein said track assembly includes two lanes and transfer means at the ends of said runs for transferring carriers from one lane to the other of said lanes.

11. A blow molding apparatus according to claim 10 wherein said carriers are elongated and have means for carrying a plurality of preforms, and said transfer means include lateral feed units.

12. A blow molding apparatus according to claim 10 wherein said carriers are individual preform carriers, and said transfer means are in the form of sockets.

13. A blow molding apparatus according to claim 3 wherein said two supply and said two return track units are parts of two separate track units having adjacent lanes with each of said adjacent lanes including a supply track unit and a return track unit.

14. A blow molding apparatus according to claim 13 wherein there is an oven associated with each of said supply track units.

* * * * *